United States Patent
Greenberg et al.

(10) Patent No.: US 11,513,218 B2
(45) Date of Patent: Nov. 29, 2022

(54) COMMUNICATION-LESS BISTATIC RANGING

(71) Applicant: RAYTHEON COMPANY, Waltham, MA (US)

(72) Inventors: Adam Hodge Greenberg, Los Angeles, CA (US); Eran Marcus, Culver City, CA (US)

(73) Assignee: RAYTHEON COMPANY, Waltham, MA (US)

( * ) Notice: Subject to any disclaimer, the term of this patent is extended or adjusted under 35 U.S.C. 154(b) by 390 days.

(21) Appl. No.: 16/863,055

(22) Filed: Apr. 30, 2020

(65) Prior Publication Data
US 2021/0341604 A1   Nov. 4, 2021

(51) Int. Cl.
*G01S 17/00* (2020.01)
*G01S 7/481* (2006.01)
*G01S 17/10* (2020.01)

(52) U.S. Cl.
CPC ........... *G01S 17/003* (2013.01); *G01S 7/4811* (2013.01); *G01S 7/4818* (2013.01); *G01S 17/10* (2013.01)

(58) Field of Classification Search
CPC .... G01S 17/003; G01S 7/4811; G01S 7/4818; G01S 17/10; G01S 7/003; G01S 7/484; G01S 7/4865; G01S 7/487; G01S 17/42; H04B 10/11; H04B 10/524
See application file for complete search history.

(56) References Cited

U.S. PATENT DOCUMENTS

| | | | |
|---|---|---|---|
| 4,527,276 A | 7/1985 | Gutleber | |
| 9,858,304 B2 | 1/2018 | Marcus et al. | |
| 10,371,818 B2 | 8/2019 | Marcus et al. | |
| 2017/0329010 A1* | 11/2017 | Warke | G01S 17/10 |
| 2018/0299536 A1 | 10/2018 | Marron et al. | |
| 2018/0364360 A1 | 12/2018 | Zellinger et al. | |

FOREIGN PATENT DOCUMENTS

| | | |
|---|---|---|
| CN | 104730535 A | 6/2015 |
| CN | 104168066 B | 8/2016 |
| EP | 1 884 800 A1 | 2/2008 |

(Continued)

OTHER PUBLICATIONS

Bansal, S., et al., "Nature-inspired metaheuristic algorithms to find near-OGR sequences for WDM channel allocation and their performance comparison," Opten Math. 2017; 15:520-547.

(Continued)

*Primary Examiner* — Nam D Pham
(74) *Attorney, Agent, or Firm* — Lewis Roca Rothgerber Christie LLP

(57) ABSTRACT

A transmitter for communication-less bistatic ranging includes a photon emitter configured to emit a plurality of photons at particular times in a pointing direction, and a processor configured to identify a particular sub-code of a plurality of sub-codes based on a dynamic state of the transmitter, each one of the plurality of sub-codes including a portion of a long optimal ranging code, generate a plurality of encoded pulse timings by dithering pulse timings from a nominal repetition frequency based on the particular sub-code, and control the photon emitter to emit the plurality of photons at the plurality of encoded pulse timings.

20 Claims, 5 Drawing Sheets

(56) References Cited

FOREIGN PATENT DOCUMENTS

EP            2 694 996 A1      2/2014
WO     WO 2015/170068 A1    11/2015

OTHER PUBLICATIONS

Dimitromanolakis, A., "Analysis of the Golomb Ruler and the Sidon Set Problems, and Determination of Large, Near-Optimal Golomb Rulers," Department of Electronic and Computer Engineering Technical University of Crete, Jun. 2002, 118 pages.
Erdos, P., et al., "On a Problem of Sidon in Additive Number Theory, and on Some Related Problems," Journal of the London Mathematical Society, vol. 16, 1941, 4 pages.
Gagliardi, R., et al., "Acquisition Sequences in PPM Communications", IEEE Transactions on Information Theory, vol. IT-33, No. 5, Sep. 1987, 7 Pages.
Hiskett, P.A., et al., "A photon-counting time-of-flight ranging technique developed for the avoidance of range ambiguity at gigahertz clock rates," Optics Express. Sep. 1, 2008, vol. 16, No. 18, 14 pages.
Mao, X., et al., "Pulse position modulation for compact all-fiber vehicle laser rangefinder development," OpticalEngineering. SPIEDigitalLibrary.org, 56(10), Oct. 2017, 9 pages.
Milstein, A.B., et al., "Acquisition algorithm for direct-detection ladars with Geiger-mode avalanche photodiodes," Applied Optics, vol. 47, No. 2, Jan. 10, 2008, 16 pages.
Gunzung Kim, et al. "Suitable Combination of Direct Intensity Modulation and Spreading Sequence for LIDAR with Pulse Coding", Sensors, vol. 18, No. 12, Nov. 30, 2018 (pp. 1-22).

International Search Report for related International Application No. PCT/US2020/066481, filed Dec. 21, 2020, International Search Report dated Mar. 23, 2021 and dated Apr. 1, 2021 (5 pgs.).
Written Opinion of the International Searching Authority for related International Application No. PCT/US2020/066481, filed Dec. 21, 2020, Written Opinion of the International Searching Authority dated Apr. 1, 2021 (5 pgs.).
International Search Report for related International Application No. PCT/US2020/066666, filed Dec. 22, 2020, International Search Report dated Mar. 25, 2021 and dated Apr. 6, 2021 (4 pgs.).
Written Opinion of the International Searching Authority for related International Application No. PCT/US2020/066666, filed Dec. 22, 2020, Written Opinion of the International Searching Authority dated Apr. 6, 2021 (6 pgs.).
Fluckiger, et al. "Optimal Pseudorandom Pulse Position Modulation Ladar Waveforms", Applied Optics, Optical Society of America, Washington D.C., US, vol. 54, No. 9, Mar. 20, 2015 (4 pgs.).
Kasher, WLAN-based-radars-in-the-60GHz-band), IEEE raft; 11-19-1854-00-SENS-WLAN-Based-Radars-In-The-60HZ-Band, IEEE-SA Mentor, Piscataway, NJ, USA, vol. 802.11 SENS, Nov. 11, 2019 (pp. 1-14), Retrieved from the Internet: URL: https://mentor.ieee.org/802.11/dcn/19/11-19-1854-00-SENS-wlan-based-radars-in-the-60ghz-band.pptx.
International Search Report in corresponding International Patent Application No. PCT/US2021/028250, International Search Report dated Jul. 9, 2021 and dated Jul. 19, 2021 (5 pgs.).
Written Opinion of the International Search Report in corresponding International Patent Application No. PCT/US2021/028250, Written Opinion dated Jul. 19, 2021 (10 pgs.).
Fluckiger, D.U. et al., "Optimal pseudorandom pulse position modulation ladar waveforms," Applied Optics, Mar. 20, 2015, vol. 54, No. 9, 4 pages.

\* cited by examiner

COMMUNICATION-LESS BISTATIC RANGING

FIELD

Aspects of the present disclosure relate to target detection.

BACKGROUND

Pulsed laser radar sensors, also known as lidars or ladars, are active sensing systems that determine the range to a target by measuring the time of flight of short laser pulses reflected off of the target. A lidar system generally includes a laser transmitter and an optical receiver. The transmitter is capable of generating laser pulses when commanded, and of directing these pulses in a particular direction. The receiver includes an optical system capable of collecting light reflected from the target, and a photodetector that can record the arrival of reflected light. An aspect of the return processing is the ability to determine target characteristics accurately despite complex scattering of the transmitted light, imperfect detection of the returns, unwanted detections due to ambient light and electrical noise, and modulation of the return due to target motion, among other practical complications.

The above information disclosed in this Background section is only for enhancement of understanding of the background of the disclosure and therefore it may contain information that does not constitute prior art.

SUMMARY

Aspects of example embodiments of the present disclosure are directed to a system and a method for bistatic lidar ranging of a target when the transmitter and receiver have no direct method of communication. According to some embodiments, the transmitter generates a long ranging code and encodes it with information about the transmitter's dynamical state (e.g., transmitter location and pointing vector). The receiver is capable of decoding the encoded long range code, and estimating range to a target based on the ranging code and the decoded dynamic state of the transmitter.

According to some embodiments of the present disclosure, there is provided a transmitter for communication-less bistatic ranging, the transmitter including: a photon emitter configured to emit a plurality of photons at particular times in a pointing direction; and a processor configured to: identify a particular sub-code of a plurality of sub-codes based on a dynamic state of the transmitter, each one of the plurality of sub-codes including a portion of a long optimal ranging code; generate a plurality of encoded pulse timings by dithering pulse timings from a nominal repetition frequency based on the particular sub-code; and control the photon emitter to emit the plurality of photons at the plurality of encoded pulse timings.

In some embodiments, the long optimal ranging code has auto-correlation side lobes less than or equal to one.

In some embodiments, each one of the plurality of sub-codes includes a portion of the long optimal ranging code and shares no more than one element from the long optimal ranging code.

In some embodiments, each one of the plurality of sub-codes is an optimal ranging code and is mutually orthogonal to other ones of the plurality of sub-codes under cross-correlation.

In some embodiments, each one of the plurality of sub-codes has auto-correlation side lobes less than or equal to a threshold, and cross-correlation side lobes of pairs of the plurality of sub-codes are less than or equal to the threshold.

In some embodiments, the plurality of sub-codes are pulse position modulated codes.

In some embodiments, the dynamic state of the transmitter includes at least one of a transmitter location, the pointing direction, or a transmission time.

In some embodiments, subsequent to controlling the photon emitter to emit the plurality of photons, the controller is configured to control the photon emitter to not transmit any pulses for a period of time corresponding to a length of a single sub-code of the plurality of sub-codes, prior to further emissions by the photon emitter.

In some embodiments, subsequent to controlling the photon emitter to emit the plurality of photons, the controller is configured to control the photon emitter to not transmit any pulses for a period of time corresponding to an odd multiple of half of a length of a single sub-code of the plurality of sub-codes, prior to further emissions by the photon emitter.

In some embodiments, the processor is configured to encode the dynamic state of the transmitter into the pulse timings via a string of one or more sub-codes of the plurality of sub-codes.

According to some embodiments of the present disclosure, there is provided a receiver for communication-less bistatic ranging, the receiver including: a photodetector configured to receive, and record timing of, incoming photons; and a processor configured to: decode an encoded pulse timing of the incoming photons to generate a detected signal; cross-correlate the detected signal with each one of a plurality of sub-codes to identify a sub-code of the plurality of sub-codes; calculate a length of a path traversed by the incoming photons from a transmitter to a target and to the photodetector based on a cross-correlation of the detected signal and the identified sub-code; identify a dynamic state of a transmitter based on the identified sub-code; and calculate a location of the target based on the length of the path traversed by the incoming photons and the identified dynamic state of the transmitter.

In some embodiments, the photodetector does not have any angular resolution.

In some embodiments, a cross-correlation of the encoded pulse timing and the identified sub-code has a peak power greater than that of the cross-correlation of the encoded pulse timing and any other one of the plurality of sub-codes.

In some embodiments, the dynamic state of the transmitter includes a transmitter location and a pointing direction of the transmitter at a transmission time of the incoming photons.

In some embodiments, the calculating of the length of the path traversed by the incoming photons includes: calculating a time lag associated with a peak of a cross-correlation of the detected signal and the identified sub-code; and calculating the length of the path traversed by the incoming photons based on the time lag.

In some embodiments, the plurality of sub-codes are common between the receiver and the transmitter.

In some embodiments, each one of the plurality of sub-codes is an optimal ranging code and is mutually orthogonal to other ones of the plurality of sub-codes under cross-correlation.

In some embodiments, each one of the plurality of sub-codes has auto-correlation side lobes less than or equal to a threshold, and cross-correlation side lobes of pairs of the plurality of sub-codes are less than or equal to the threshold.

According to some embodiments of the present disclosure, there is provided a bistatic ranging system for identifying a location of a target, the bistatic ranging system including: a transmitter including: a photon emitter configured to emit a plurality of photons at particular times in a pointing direction; and a first processor configured to: identify a particular sub-code of a plurality of sub-codes based on a dynamic state of the transmitter; generate a plurality of encoded pulse timings by dithering pulse timings from a nominal repetition frequency based on the particular sub-code; and control the photon emitter to emit the plurality of photons at the plurality of encoded pulse timings; and a receiver including: a photodetector configured to receive, and record timing of, incoming photons; and a second processor configured to: decode an encoded pulse timing of the incoming photons to generate a detected signal; cross-correlate the detected signal with each one of a plurality of sub-codes to identify a sub-code of the plurality of sub-codes; and calculate a location of the target based on a cross-correlation of the detected signal and the identified sub-code.

In some embodiments, the transmitter and receiver are geographically separate from one another and have no means of direct communication.

BRIEF DESCRIPTION OF THE DRAWINGS

These and other features of some example embodiments of the present disclosure will be appreciated and understood with reference to the specification, claims, and appended drawings, wherein:

DETAILED DESCRIPTION

The detailed description set forth below in connection with the appended drawings is intended as a description of some example embodiments of a system and a method for bistatic ranging provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Aspects of the present disclosure are directed to a communication system capable of communication of spectrally dense, and covertly modulated and encoded data through a power efficient transmit chain.

Some embodiments of the present disclosure are directed to a bistatic ranging system capable of identifying the location of a target using a transmitter and receiver that have no means of direct communication. In some examples, the transmitter and receiver may be geographically separated. While performing the ranging operation, one or more of the transmitter and receiver may be in motion or both may be stationary. In some embodiments, the transmitter generates a long ranging code that is encoded with information about the transmitter's dynamical state (e.g., transmitter location and pointing vector). The receivers is capable of decoding the encoded long range code, and identifying the location of the target based on the ranging code and the decoded dynamic state of the transmitter.

Figure 1A:
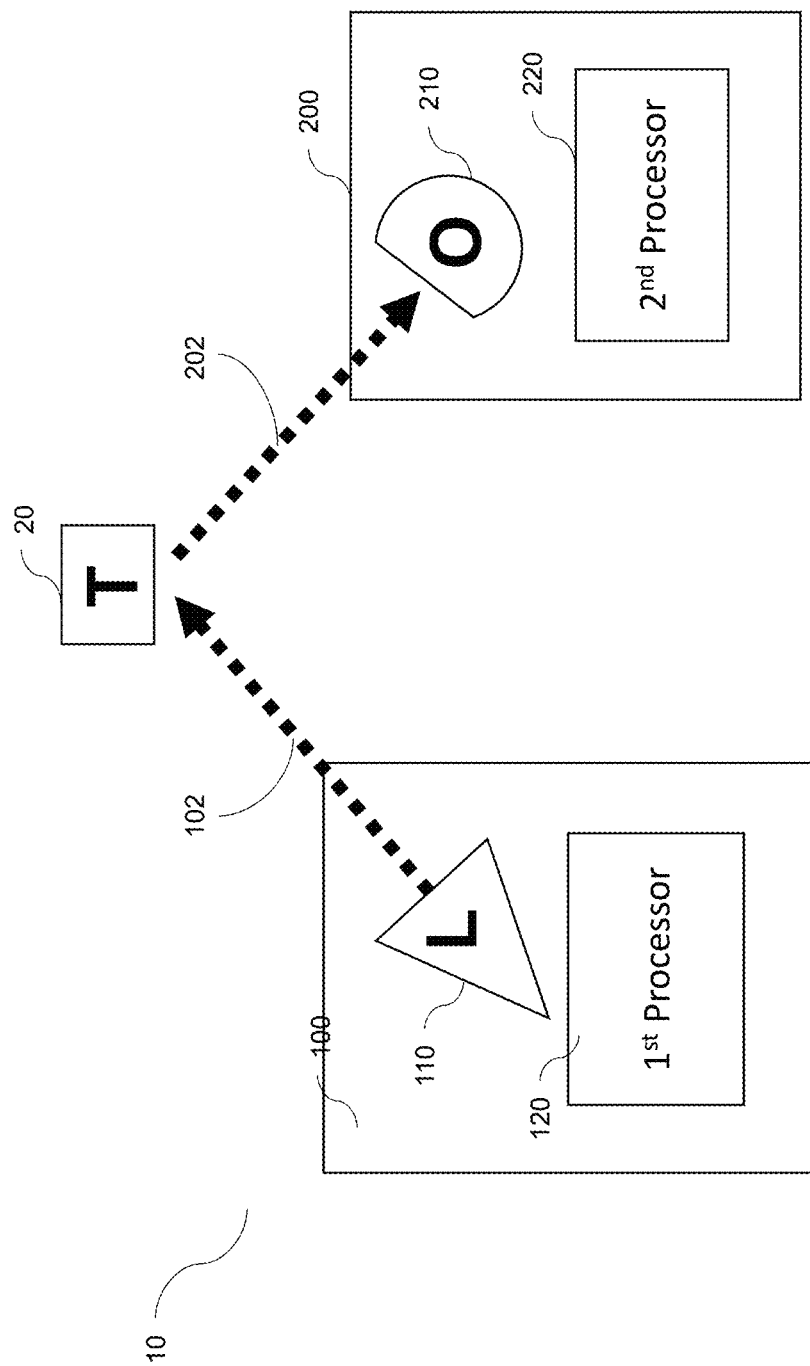
FIG. 1A illustrates a bistatic ranging system according to some embodiments of the present disclosure.
Figure 1B:
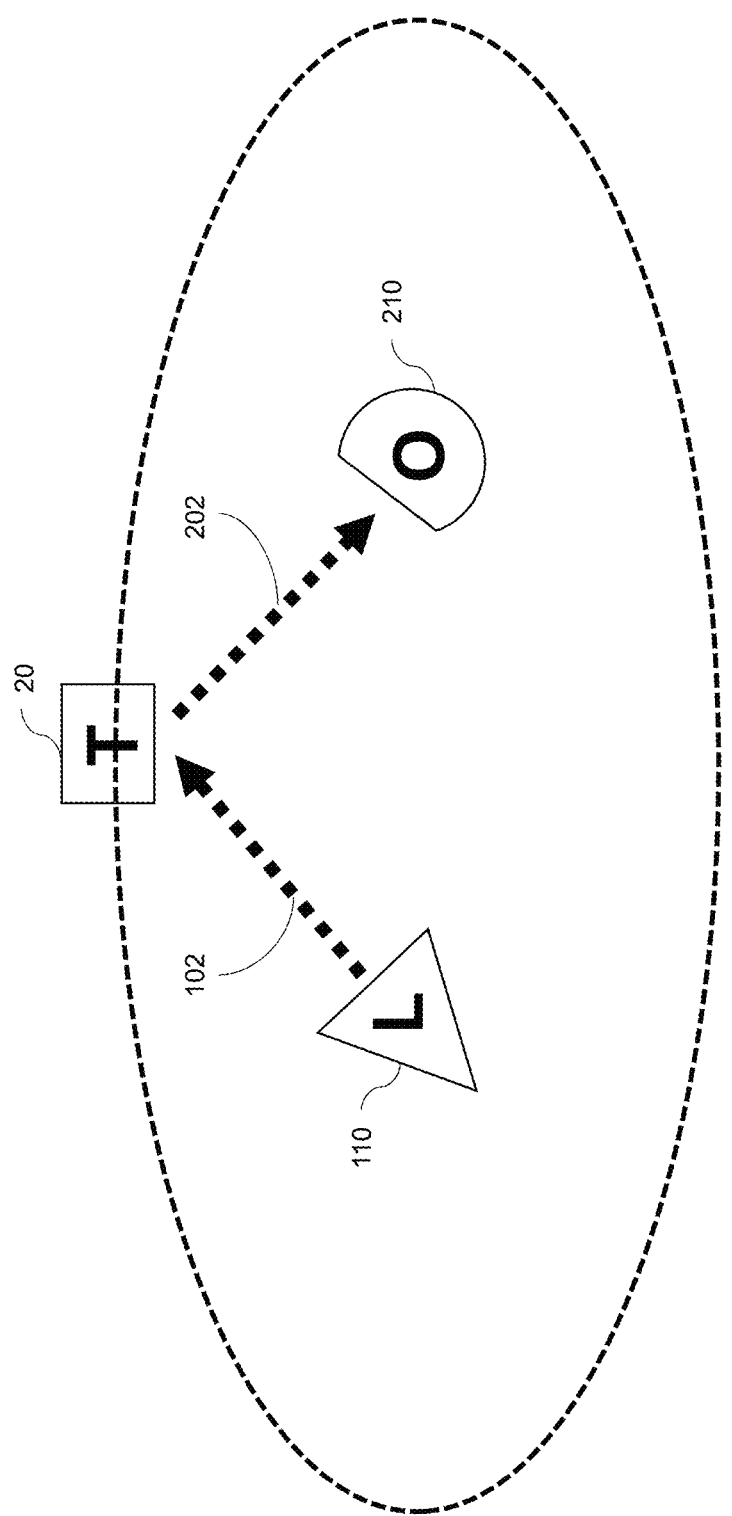
FIG. 1B illustrates an iso-range contour defined by the position of the target relative to the transmitter and receiver of the bistatic ranging system of FIG. 1A.

FIG. 1A illustrates the bistatic ranging system 10 according to some embodiments of the present disclosure. FIG. 1B illustrates an iso-range contour defined by the position of the target relative to the transmitter 100 and receiver 200 of the bistatic ranging system of FIG. 1A.

Referring to FIG. 1A, the bistatic ranging system 10, which includes a transmitter 100 and a receiver 200 that are separated, is capable of determining the position (e.g., absolute geographical position) of a desired target 20. Here, the target 20 may be stationary or may be a moving target, and each of the transmitter 100 and the receiver 200 may also be stationary or may be in motion while the bistatic ranging system 10 is performing ranging operation.

The transmitter 100 may include a photon emitter (e.g., a laser) 110 for emitting a plurality of photons 102 in a pointing direction, and a first processor 120 for controlling the timing of pulses emitted by the photon emitter 110. The receiver 200 may include a photodetector 210 for receiving, and recording the timing of, incoming photons 202, and a second processor 220 for calculating the position of the target 20 based on the timing of the incoming photons detected by the photodetector 210. The incoming photons 202 may include some of the transmitted photons 102, which have reflected off of the target 20, as well as photons from other background sources (e.g., the sun or other light sources), which produce unwanted noise in the detected signal.

According to some embodiments, the receiver 200 does not have any angular resolution, and only counts and time-stamps photons that it receives within a hemisphere without knowledge of the photons' angle of incidence. In some embodiments, the transmitter 100 and the receiver 200 share a common clock (e.g., a synchronized clock), but may have no means of direct communication (e.g., no means of communication other than the emitted photons detected by the receiver 200). However, a shared clock is not a necessary condition for the function of the system.

Referring to FIG. 1B, according to some embodiments, the transmitter 100 transmits a plurality of photons (e.g., laser pulses) toward the target 20 at a predetermined time and encodes its location and pointing direction in the transmitted photonic signal, and the receiver 200 is capable of decoding the received signal to extract the transmitter's location and pointing direction. The receiver 200 measures the time difference of arrival of the signal from the transmitter 100 via reflection from the target 20. The time difference allows the receiver 200 to calculate the total travel distance from the transmitter 100 to the target 20 and from the target 20 to the receiver 200. This distance defines an ellipse of constant bistatic range, referred to as an iso-range contour, on which the target lies, with foci centered on the transmitter 100 and the receiver 200. With knowledge of the transmitter's position and pointing vector, the receiver 200 can localize the target's position on the ellipse and thus calculate the target's absolute position.

In some embodiments, the transmitter 100 enables the receiver 200 to accomplish unambiguous range determination by transmitting pulse position modulated (PPM) waveforms.

Figure 2A:
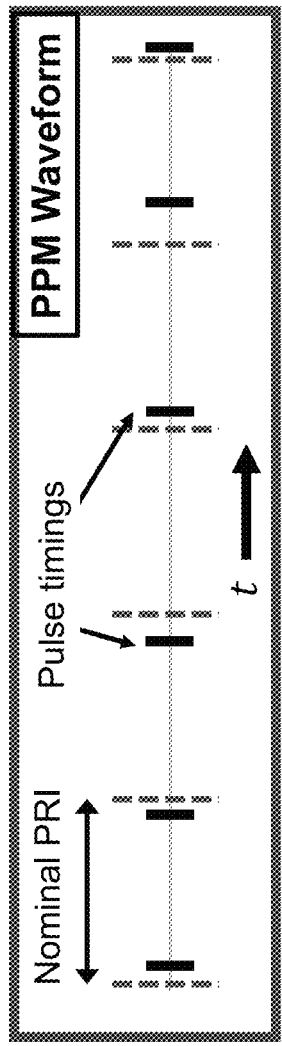
FIG. 2A illustrates a portion of a pulse position modulated (PPM) waveform, according to some embodiments of the present disclosure.
Figure 2B:
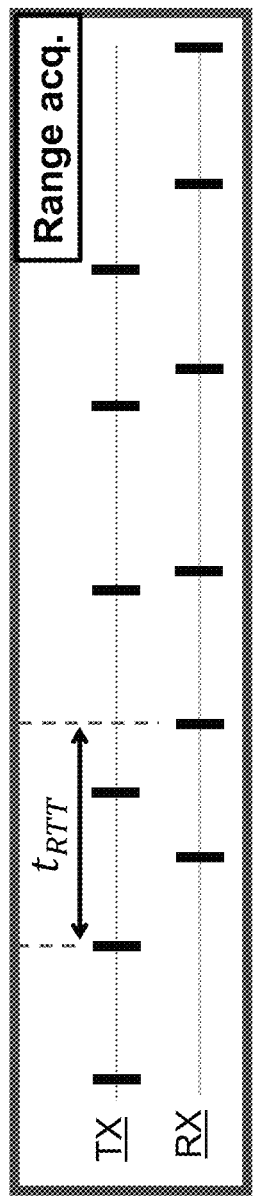
FIG. 2B illustrates the process of unambiguous range acquisition based on a received PPM waveform, according to some embodiments of the present disclosure.

FIG. 2A illustrates a portion of a PPM waveform, according to some embodiments of the present disclosure. FIG. 2B illustrates the process of unambiguous range acquisition based on a received PPM waveform, according to some embodiments of the present disclosure.

Referring to FIG. 2A, according to some embodiments, the transmitter 100 generates a pulse position modulated waveform, whereby pulse timings are encoded by dithering them from a nominal repetition frequency (of, e.g., 1 KHz) according to a particular sub-code (e.g., a portion of a long optimal ranging code). In some embodiments, the first processor 120 generates a plurality of encoded pulse timings by dithering pulse timings from a nominal repetition frequency based on the particular sub-code and controls the photon emitter 110 to emit a plurality of photons at the plurality of encoded pulse timings. As shown in FIG. 2A, as a result of the encoded dithering, some of the pulse timings may be delayed from a nominal pulse repetition interval (PRI; e.g., 1 ms), while others may be anti-delayed, by amounts determined by the code. The particular sub-code used by the transmitter 100 may be one among a plurality of set or predetermined sub-codes that are each part of a long optimal ranging code (to be described further below). In some embodiments, the receiver 200 has knowledge of the pool of sub-codes available to the transmitter 100.

Referring to FIG. 2B, in some embodiments, the receiver 200 (e.g., the second processor 220) unambiguously determines the total travel time of the incoming photons (which corresponds to the total travel distance from the transmitter 100 to the target 20 and from the target 20 to the receiver 200) by cross correlating the return timings of the detected photons with transmit timings of each sub-code from the pool of sub-codes available to the transmitter 100 to identify the particular sub-code utilized by the transmitter. The receiver 200 may do so by identifying the sub-code that produces the highest cross-correlation value. The transmitter 100 initiates the transmittal of pulses at predetermined times known to the receiver 200, and the lag associated with the peak of the cross-correlation of the identified sub-code with the return timings yields the total travel time ($t_{RTT}$).

According to some embodiments, the long optimal ranging code is an optimal waveform with N elements (N being an integer greater than 1), which has no auto-correlation sidelobes with height greater than one or equivalently has a peak-to-maximum-side-lobe ratio (PMSLR) equal to N. This enables the bistatic ranging system 10 to unambiguously determine the position of the target from just two signal photo-electrons at the receiver 200.

Figure 3B:
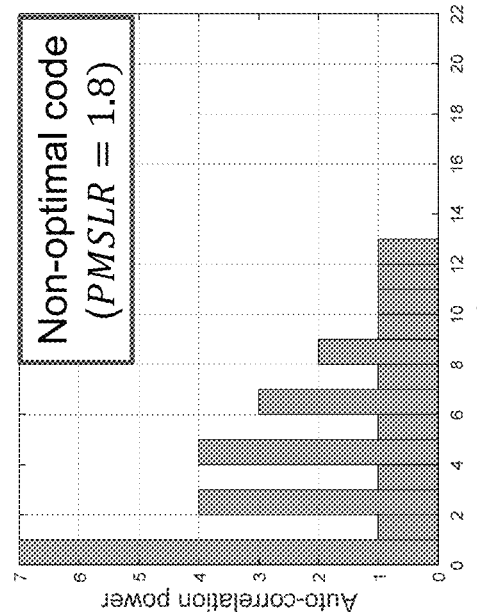
FIGS. 3A-3B respectively illustrate the auto-correlation power of an optimal waveform with 7 elements and a non-optimal waveform with the same number of elements, according to some examples.
Figure 3A:
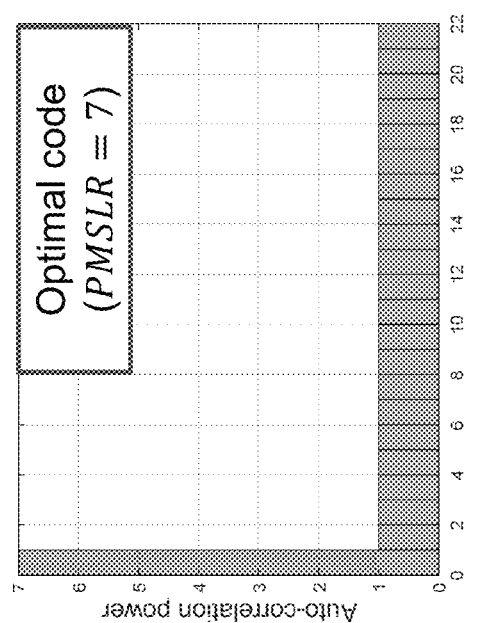

FIGS. 3A-3B respectively illustrate the auto-correlation power of an optimal waveform with 7 elements and a non-optimal waveform with the same number of elements, according to some examples. As shown in the example of FIG. 3A, the optimal waveform produces an auto-correlation with sidelobes equal to one and a PMSLR of 7, while the non-optimal waveform shown in example of FIG. 3A produces auto-correlation sidelobes greater than 1 and has a PMSLR of 1.8. The latter waveform may thus be unsuitable for use in bistatic ranging according to some embodiments of the present disclosure.

According to some embodiments, the first processor 120 of the transmitter 100 generates long optimal codes using the following equation:

$$t_m = \left(\left\lceil \frac{T_{PRI}}{\Delta j} \right\rceil m + (m^2)_{p^*} - \frac{p^*-1}{2}\right)\Delta j \quad \text{(Equation 1)}$$

where $\Delta j$ represents the modulation resolution (also referred to as jitter or dither resolution) of the transmitter 100, $T_{PRI}$ represents the pulse repetition interval of the transmitter 100, m is an index greater than or equal to zero and less than a prime integer $p^*$, and $t_m$ represents a pulse timing of the plurality of pulse timings making up the optimal PPM code. Here, the prime integer $p^*$ may be expressed as $$p^* = \max\left\{p \leq \left\lfloor 2f_j \frac{T_{PRI}}{\Delta j}\right\rfloor, \text{ for prime } p\right\} \quad \text{(Equation 2)}$$

where $f_j$ represents the maximum modulation level, expressed as a fraction of the laser's nominal pulse repetition interval (e.g., for a maximum modulation level of 100 microseconds and a pulse repetition interval of 1 ms, $f_j=10\%$). The resulting optimal waveform has $N=2\times(PRI/\Delta_j)\times f_j$ elements, which can be rewritten as:

$$N = \frac{v_T}{PRF} \quad \text{(Equation 3)}$$

where $v_T:=2f_j/\Delta j$ represents the timing system bandwidth, and PRF is the nominal pulse repetition frequency of the optimal waveform, which is the inverse of the pulse repetition interval $T_{PRI}$. Henceforth, the symbol P may be used to refer to the optimal code/waveform of length N that is generated based on Equation 1.

Because code P is optimal, it's auto-correlation, P*P has a maximum value of 1 over all positive lags, $\Delta t > 0$. In other words:

$$[P*P](\Delta t=0)=N \quad \text{(Equation 4)}$$

$$[P*P](\Delta t>0)\leq 1 \quad \text{(Equation 5)}$$

According to some embodiments, the long optimal code P is used to generate the plurality of sub-codes $p_i$ (i being an integer greater than 0) that are shared by both the transmitter 100 and the receiver 200. Each of the sub-codes $p_i$ includes $n_s$ elements ($n_s<N$) of the long optimal code P and shares at most one common element with each of the other sub-codes (i.e., has an overlap of one or fewer elements). That is, for each sub-code $p_i$ and $p_j$ (j being an integer greater than 0 and $i \neq j$) of the plurality of sub-codes:

$$p_1 \subset P, p_2 \subset p \quad \text{(Equation 6)}$$

$$|p_1 \cap p_2| \leq 1 \quad \text{(Equation 7)}$$

Each sub-code $p_i$ is optimal, that is, $$[p_i*p_i](\Delta t=0)=n_s \text{ and} \quad \text{(Equation 8)}$$

$$[p_i*p_i](\Delta t>0)\leq 1), \quad \text{(Equation 9)}$$

and each pair of sub-code $p_i$ and $p_j$ is mutually orthogonal under cross-correlation, that is, $$[p_i{}^*p_j] \leq 1. \quad \text{(Equation 10)}$$

According to some embodiments, a number η (where η:=N/$n_s$) of optimal and mutually orthogonal sub-codes (each of length $n_s$) can be constructed from the original optimal code of length N. Embodiments of the present disclosure are not limited to sub-codes of the same length, and one or more sub-codes may have lengths different from the other sub-codes, so long as no two sub-codes overlap by more than one element.

Each of the sub-codes may represent a symbol in a shared alphabet, which can be used to communicate information from the transmitter 100 to the receiver 200. Thus, in some embodiments, the transmitter 100 and the receiver 200 share a common alphabet of η symbols (i.e., η sub-codes), each of which is readily distinguishable from all the others under cross-correlation and can be used to unambiguously range (e.g., identify a position of) a target. According to some embodiments, each symbol (i.e., sub-codes), $p_i$, in this alphabet can be unambiguously distinguished from any other symbol by the successful measurement of just a single pair of pulses from that symbol (due to the property that the cross-correlation of each pair of symbols has a power less than or equal to 1, as expressed in Equation 10). Further, each symbol (i.e., sub-codes), $p_i$, in this alphabet can unambiguously yield a range measurement by the successful measurement of just a single pair of pulses from that symbol (due to the property that each symbol is an optimal code, as expressed by Equations 8-9). Thus, the transmitter 100 may embed information (e.g., its own position, pointing vector, and/or time of transmission) within a ranging code, and transmit that code at the target 20, the reflections off of which the receiver 200 can detect.

According to some embodiments, in addition to sharing a common alphabet of symbols/sub-codes, the transmitter 100 and receiver 200 agree on a nominal pulse repetition interval $T_{PRI}$ associated with the shared symbols, a word length K (in units of symbols), and a set of word transmit times, $t_i$={$iKn_sT_{PRI}$: i∈ℤ}, under a shared clock (e.g., a synchronized clock). In some embodiments, at each word transit time $t_i$, the transmitter 100 encodes the current value of its dynamic state (e.g., its spatial position and pointing vector) using the shared alphabet, and then transmits that encoding at the target 20. The receiver 200 the detects the reflections off of the target 20, and thereby measures both the total travel distance and the pointing vector concurrently (simultaneously), which allows the receiver 200 to solve for the target's absolute spatial position. In embodiments in which the transmitter 100 also encodes its transmission time within the ranging code, the receiver 200 to solve for the target's absolute spatial position even in the absence of the shared clock with the transmitter 100.

In some embodiments, the consecutive transmitted symbols may be separated by a period of non-transmission to prevent the cross-correlation from peaking at the seam between consecutive symbols. This may be done because the combination of two consecutive symbols may not necessarily be mutually orthogonal with a third symbol. This lack of mutual orthogonality at the "seams" of symbols may result in cross-correlation peaks at the receiver 200 that do not correspond to any transmitted symbol, and thus cause detection error. To eliminate any potential for lack of mutual orthogonality at the "seams" of symbols, the transmitter 100 may inject a period of non-transmission between consecutive symbols.

In some embodiments, the bistatic ranging system 10 defines $p_0$ as an empty sub-code of length n PRIs (i.e., $p_0$ is defined as a period of length $nT_{PRI}$ during which there are no transmissions). Then the code $p_{ij}$:=[$p_i$, $p_0$, $p_j$] will be orthogonal to sub-code $p_k$ (where k is an integer different from i and j). In some examples, transmitter 100 may either turn the photon emitter 110 off for times that occur during any $p_0$ (e.g., akin to burst mode), or the transmitter 100 may physically point off target during those periods. Either way, the transmitter 100 may maintain the same overall transmit schedule as before, just with select periods of darkness. However, with this approach the data-rate of the bistatic ranging system 10 may be halved, as each message may have to be twice as long to accommodate all of its bits. The data-rate may be improved by shortening the dark periods.

According to some embodiments, the bistatic ranging system 10 defines $p'_0$ as an empty sub-code of length $l_m$=½(2m+1) PRIs m being a non-negative integer). Then the code $p_{ij}$:=[$p_i$, $p_0$, $p_j$] will also be orthogonal to $p_k$. That is, the transmitter 100 delays between each symbol by an odd multiple of a half PRI, which means that every other symbol transmitted by the transmitter 100 will be off-schedule. Because m can be any non-negative integer, one can choose m>0, and therefore $l_m$>1, meaning that the instantaneous PRI of the laser need never exceed the original maximum instantaneous PRI. In such embodiments, the data rate only goes down by a factor of $$\frac{l_m}{n},$$

where n is the average length of the sub-codes. For example, if the transmitter 100 uses m=1, then for a scenario using sub-codes of length n=100, data rate will only drop by 1.5%.

Figure 4:
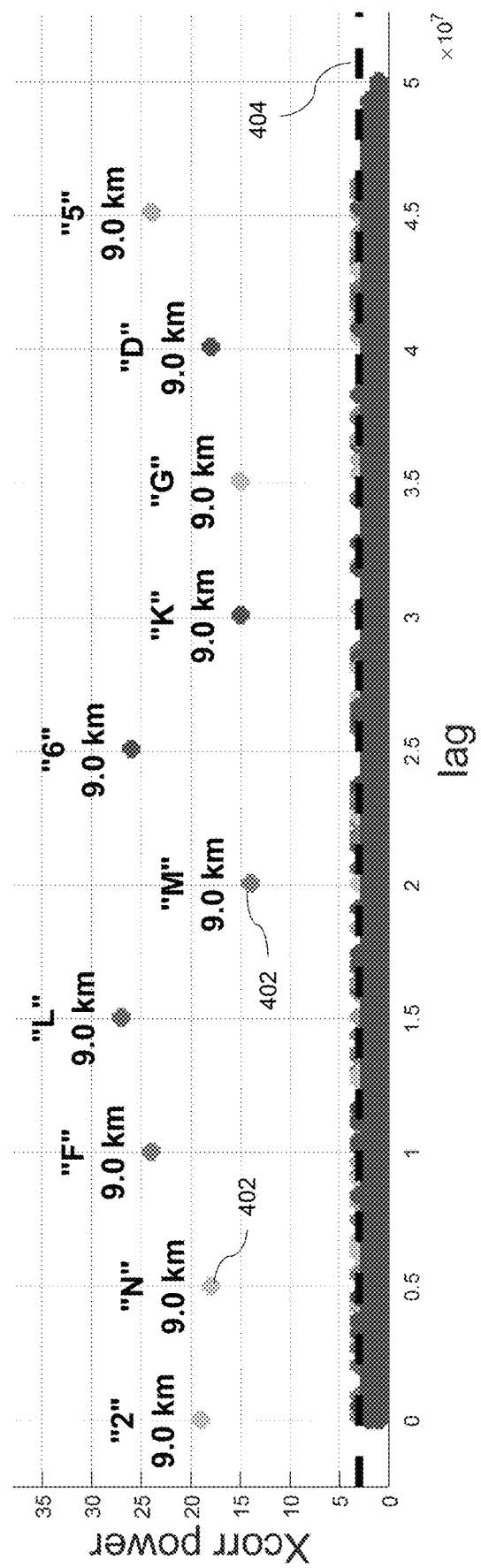
FIG. 4 is a simulation diagram illustrating the ability of the communication-less bistatic ranging system to range a target, according to some embodiments of the present disclosure.

FIG. 4 is a simulation diagram illustrating the ability of the communication-less bistatic ranging system 10 to range a target, according to some embodiments of the present disclosure.

In the example of FIG. 4, the bistatic ranging system 10 has a pulse repetition frequency (PRF) of 10 kHz, with a modulation resolution of Δj=4 ns and a maximum modulation fraction of $f_j$=10%. Based on these system parameters, and using Equations 1-3, one can generate an optimal waveform/code with N=5000 elements. With an alphabet having 200 pulses per symbol, the alphabet size is 25 symbols. The target has been placed at a position 5 km from the transmitter 100 and 4 km from the receiver 200. The simulation of FIG. 4 assumes a 90% pulse loss rate and a signal-to-noise ratio (SNR) of −10 dB. Here, with a transmitted message being the first 10 Fibonacci numbers ("11235813213455"), which translates to "2NFLM6KGD5" in base 25, the receiver 200 has correctly determined the total travel distance of the pulses (i.e., 9 km) and has correctly decoded the symbols embedded in the transmission, despite the high pulse loss rate. In FIG. 4, each of the cross-correlation peaks 402 represents a match between the detected pulses and a symbol/sub-code from the pool of shared symbols/sub-codes, and the data points below the threshold 404 represent sidelobes of cross-correlation pairs or cross-correlation peaks resulting from partial matches between noisy return pulses and the pool of shared symbols. The threshold 404 may be determined based on the background rate. In the absence of background detection (e.g., background noise), the threshold 404 may be 1; however, in the presence of background detections, the threshold 404 may be higher than 1 (as is the case in the example of FIG. 4, where the threshold 404 is set to four).

As described above, the complexity of the bistatic ranging system 10, according to some embodiments, is pushed into the encoding process of the transmitter 100, and many of the requirements on the receiver 200 have been eliminated. For example, the receiver 200 does not need to have an optical laser, does not need to have any radio transmission or reception capabilities, does not need to be able to track, and does not need to have any angular resolution. Instead, the photodetector 210 of the receiver 200 may only be capable of photon detection and time tagging, and the receiver 200 may have processing capabilities (via the second processor 220) to decode and utilize the information encoded in the timestamps of the received pulses. In fact, the quality of the target tracking that the receiver 200 can generate may only be a function of parameters that are entirely controlled by the transmitter (not including the receiver's clock accuracy). This allows the receiver to have a low (or minimized) size, weight, power usage, and cost. This makes embodiments of the present disclosure particularly useful in applications that employ a single transmitter and multiple receivers to track one or more targets.

The operations performed by the constituent components of the transmitter 100 and the receiver 200 (e.g., by the first and second processors 120 and 220) may be performed by a "processing circuit" that may include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

While the present invention has been illustrated and described with reference to the embodiments thereof, it will be apparent to those of ordinary skill in the art that various suitable changes in form and detail may be formed thereto without departing from the spirit and scope of the present invention, as defined by the following claims and equivalents thereof.

What is claimed is:

1. A transmitter for communication-less bistatic ranging, the transmitter comprising:
    a photon emitter configured to emit a plurality of photons at particular times in a pointing direction; and
    a processor configured to:
        identify a particular sub-code of a plurality of sub-codes based on a dynamic state of the transmitter, each one of the plurality of sub-codes comprising a portion of a long optimal ranging code;
        generate a plurality of encoded pulse timings by dithering pulse timings from a nominal repetition frequency based on the particular sub-code; and
        control the photon emitter to emit the plurality of photons at the plurality of encoded pulse timings.

2. The transmitter of claim 1, wherein the long optimal ranging code has auto-correlation side lobes less than or equal to one.

3. The transmitter of claim 1, wherein each one of the plurality of sub-codes comprises a portion of the long optimal ranging code and shares no more than one element from the long optimal ranging code.

4. The transmitter of claim 1, wherein each one of the plurality of sub-codes is an optimal ranging code and is mutually orthogonal to other ones of the plurality of sub-codes under cross-correlation.

5. The transmitter of claim 1, wherein each one of the plurality of sub-codes has auto-correlation side lobes less than or equal to a threshold, and cross-correlation side lobes of pairs of the plurality of sub-codes are less than or equal to the threshold.

6. The transmitter of claim 1, wherein the plurality of sub-codes are pulse position modulated codes.

7. The transmitter of claim 1, wherein the dynamic state of the transmitter comprises at least one of a transmitter location, the pointing direction, or a transmission time.

8. The transmitter of claim 1, wherein, subsequent to controlling the photon emitter to emit the plurality of photons, the controller is configured to control the photon emitter to not transmit any pulses for a period of time corresponding to a length of a single sub-code of the plurality of sub-codes, prior to further emissions by the photon emitter.

9. The transmitter of claim 1, wherein, subsequent to controlling the photon emitter to emit the plurality of photons, the controller is configured to control the photon emitter to not transmit any pulses for a period of time corresponding to an odd multiple of half of a length of a single sub-code of the plurality of sub-codes, prior to further emissions by the photon emitter.

10. The transmitter of claim 1, wherein the processor is configured to encode the dynamic state of the transmitter into the pulse timings via a string of one or more sub-codes of the plurality of sub-codes.

11. A receiver for communication-less bistatic ranging, the receiver comprising:
    a photodetector configured to receive, and record timing of, incoming photons; and
    a processor configured to:
        decode an encoded pulse timing of the incoming photons to generate a detected signal;

cross-correlate the detected signal with each one of a plurality of sub-codes to identify a sub-code of the plurality of sub-codes;

calculate a length of a path traversed by the incoming photons from a transmitter to a target and to the photodetector based on a cross-correlation of the detected signal and the identified sub-code;

identify a dynamic state of a transmitter based on the identified sub-code; and calculate a location of the target based on the length of the path traversed by the incoming photons and the identified dynamic state of the transmitter.

12. The receiver of claim 11, wherein the photodetector does not have any angular resolution.

13. The receiver of claim 11, wherein a cross-correlation of the encoded pulse timing and the identified sub-code has a peak power greater than that of the cross-correlation of the encoded pulse timing and any other one of the plurality of sub-codes.

14. The receiver of claim 11, wherein the dynamic state of the transmitter comprises a transmitter location and a pointing direction of the transmitter at a transmission time of the incoming photons.

15. The receiver of claim 11, wherein the calculating of the length of the path traversed by the incoming photons comprises:
   calculating a time lag associated with a peak of a cross-correlation of the detected signal and the identified sub-code; and
   calculating the length of the path traversed by the incoming photons based on the time lag.

16. The receiver of claim 11, wherein the plurality of sub-codes are common between the receiver and the transmitter.

17. The receiver of claim 11, wherein each one of the plurality of sub-codes is an optimal ranging code and is mutually orthogonal to other ones of the plurality of sub-codes under cross-correlation.

18. The receiver of claim 11, wherein each one of the plurality of sub-codes has auto-correlation side lobes less than or equal to a threshold, and cross-correlation side lobes of pairs of the plurality of sub-codes are less than or equal to the threshold.

19. A bistatic ranging system for identifying a location of a target, the bistatic ranging system comprising:
   a transmitter comprising:
      a photon emitter configured to emit a plurality of photons at particular times in a pointing direction; and
      a first processor configured to:
         identify a particular sub-code of a plurality of sub-codes based on a dynamic state of the transmitter;
         generate a plurality of encoded pulse timings by dithering pulse timings from a nominal repetition frequency based on the particular sub-code; and
         control the photon emitter to emit the plurality of photons at the plurality of encoded pulse timings; and
   a receiver comprising:
      a photodetector configured to receive, and record timing of, incoming photons; and
      a second processor configured to:
         decode an encoded pulse timing of the incoming photons to generate a detected signal;
         cross-correlate the detected signal with each one of a plurality of sub-codes to identify a sub-code of the plurality of sub-codes; and
         calculate a location of the target based on a cross-correlation of the detected signal and the identified sub-code.

20. The bistatic ranging system of claim 19, wherein the transmitter and receiver are geographically separate from one another and have no means of direct communication.

* * * * *